United States Patent Office 3,313,648
Patented Apr. 11, 1967

3,313,648
TREATMENT OF GLASS GLAZING VULNERABLE TO IMPACT BY INSECTS
Robert B. Johnson, Wichita, Kans., assignor to The Boeing Company, Seattle, Wash., a corporation of Delaware
No Drawing. Filed Apr. 5, 1965, Ser. No. 445,687
3 Claims. (Cl. 117—124)

This application is a continuation-in-part of my earlier filed applications Ser. No. 81,936, filed Jan. 11, 1961, now abandoned; Ser. No. 98,741, filed Mar. 28, 1961, now abandoned; and Ser. No. 127,474, filed July 28, 1961, now abandoned.

This invention relates to the treating of solid hydrophilic materials with certain organo-silicon compounds for purpose of modifying a surface of the normally hydrophilic material so as to cause the surface to be hydrophobic.

An object of this invention is to provide a novel method of treating hydrophilic materials, and/or novel hydrophobic materials resulting from such treatment.

It is another object of this invention to provide a novel method of reactively treating materials having reactive hydrogen thereon with organo silanes, and/or to provide novel materials resulting from the reactive treating having a coating thereon of the residue of the reaction, the new materials being water repellent, inert on the surface thereof, and easily partable with other materials or matter such as water, organic residue of insects, plastics, metals, ceramics, celluloses, and so forth.

Another object of my invention is to provide novel hydrophobic materials that are water repellent, partable, and/or reactively inert on the surface thereof, and/or to provide novel methods of making hydrophilic materials hydrophobic.

It is an object of this invention to provide a novel method of maintaining glazing, especially on high speed vehicles.

It is still another object of this invention to provide a novel method to make glass water repellent, particularly glass aircraft glazing, and/or to provide novel water repellent glass resulting from the treating especially suitable for use on high speed vehicles.

Another object of this invention is to provide a method of maintaining transparent areas of glazing free of visibility limiting contaminations.

Still another object of this invention is to provide a new method of reactively treating glass normally having reactive hydrogen thereon with organo silanes, and/or to provide new water repellent glass resulting from the treating thereof and having the residue of the reaction as a coating thereon.

Still another object of this invention is to provide a new glass windshield means and a method of maintaining glass glazing of windshield means by providing for treatment of same and removal of insect residues therefrom, following the impact contacting of insects on the windshield means.

It is still another object of this invention to provide a method for maintaining aircraft glass windshields clean and transparent during operation wherein the aircraft windshield is contacted by insects.

It is yet another object of this invention to provide a new method of heating hydrophilic plastic material to make same partable and/or surface inert, and to provide new plastic materials resulting from the treating thereof.

Still another object of this invention is to provide a new method of treating sheet or film hydrophilic plastic material such as polyvinylalcohol with organo silanes, and to provide new plastic sheet or film materials having as a hydrophobic coating thereon the residue of the reaction and which are easily partable, surface inert sheets or films for use in vacuum bag molding processes for producing plastic parts.

Still other objects and advantages of the new method of my invention will become apparent to those skilled in the art to which it pertains from the following description of the present preferred embodiments thereof.

It is to be understood that the invention is not limited to the details of the embodiments hereinafter described in detail, but is capable of being otherwise embodied and of being practiced and carried out in various ways. It is to be further understood that the phraseology or terminology employed herein is for the purpose of description and there is no intention to herein limit the invention beyond the requirements of the prior art.

A discussion and description of the new method of my invention and the new materials of my invention are set forth in the following. It is to be understood that such discussion and description is not to unduly limit the scope of my invention.

The new method of my invention can be utilized with and carried out on materials which normally have reactive hydrogen on the surface thereof when exposed to the atmosphere, or which can be treated to provide reactive hydrogen on the surface thereof. The new method of my invention is particularly desirably employed to make glass water repellent, for example glass aircraft glazing, vehicle windshields, glass measuring equipment, and other glassy and ceramic materials. Another very valuable application of the new method of my invention is to make plastic materials normally having reactive hydrogen on the surface thereof easily partable from other materials, and plastic materials which can be made to have reactive hydrogen on the surface thereof can be treated by the new method of my invention to result in being easily partable from other materials. Plastic forming molds for making plastic parts and the like, can be treated by the new method of my invention to make them very easily partable from the plastic goods formed. Sheet or film plastic material used in vacuum bag forming operations can be treated to make it easily partable from the plastic articles produced. Some of the more preferred plastic materials which can be successfully and very advantageously treated by the new method of my invention to provide a parting agent coating thereon are polyvinylalcohol, polyvinylacetate, cellulose acetate, cellophane (regenerated cellulose film), polyamides, such as nylon, polyester films other than cellulose acetate, and the like. And, it is to be understood that in most instances as a result of the practice of my invention of these materials they are made water repellent as well as easily partable from other materials. Fabrics of wool, silk, cotton, linen, or the thread therefor, and the like, can be treated by the new method of my invention to make them water repellent, or so that they will not adhere readily to other materials, and metals, such as aluminum, magnesium, and the like, wood, paper, etc., can be treated by the new method of my invention to make the materials water repellent and/or easily separable or partable from other material. The materials set forth herein which can be treated by the new method of my invention are given for illustrative purposes only, and it is to be understood that they are not to unduly limit the scope of my invention.

In carrying on the new method of my invention, an organo-carboxy silane is employed, such being contacted with the material to be treated and having reactive hydrogen on the surface thereof. The organo-carboxy silane reacts with the reactive hydrogen, leaving a chemically united residue on the surface of the material, such residue being the product of the reaction.

The new method of my invention can be utilized with and carried out on glazing which has reactive hydrogen on the surface thereof, or which can be treated to provide reactive hydrogen on the surface. It is preferably applied to glass glazing such as on aircraft windshields, but can be equally successfully utilized with plastic material glazing which has reactive hydrogen on the surface thereof, or which can be treated to provide reactive hydrogen on the surface. These hydrophilic surfaces can be treated by the new method of my invention. It has been found that a clean glass windshield exposed to the elements has reactive hydrogen on the surface thereof, if the air has any moisture at all therein or if the cleaned glass has been in contact with moisture. The surface of such glazing is hydroxylated. However, it is highly preferred in carrying out the new method of my invention to commence with a clean glass, because dirt, dust, grease, oil, and the like, on the glass interferes with carrying on the new method of my invention, particularly the step wherein the glass is treated to coat same with a chemically united parting agent.

Glass aircraft windshields become dirty and soiled in manufacture due to handling, etc. and they become particularly soiled and dirty during operation of the aircraft. In cleaning the glass windshield, it is preferred to first scrub the glass with an abrasive cleaner carried on a soft absorbent fabric. A pad made up of cheesecloth has been found very satisfactory. Any suitable abrasive cleaner can be employed. Aluminum polish of finely divided aluminum oxides dispersed in water containing a detergent has been found to be a very satisfactory abrasive cleaner. The abrasive cleaner should be of a fine enough particle size to leave a mirror finish. The cleaner may be of silicon carbide, boron carbide, diatomaceous earth, rouge, etc. in lieu of using aluminum oxides. These cleaners work very well and can be used above the freezing point of water. After thorough scrubbing with these aluminum polish abrasive cleaners, it has been found desirable to thoroughly rinse the glass with a generous amount of distilled water until all of the cleaner is removed.

Next in the glass cleaning operation, it is preferred to scrub the windshield with a generous amount of an alkaline cleaner remover containing a detergent, and such can be accomplished easily with a soft absorbent fabric and a liquid alkaline cleaner. Any suitable alkaline cleaner can be employed, for example a water and trisodium phosphate solution, ammonium hydroxide, dilute caustic solution, etc., but I prefer to use an alkaline emulsion cleaner remover in generous amount on a pad of clean cheesecloth. In particular, a suitable alkaline emulsion cleaner consists of a mixture of 100 parts per volume of perchloroethylene (ethylene tetrachloride) and 100 parts per volume alkaline cleaning solution containing 4 ounces per gallon of sodium phosphate sodium silicate mixture as a buffer. These are emulsified with three wetting agents that are two different polyethylene oxide phenols of different molecular weights mixed with polyalkaline glycol ether. The first wetting agent consists of 5 parts per volume of a nonionic wetting agent in which the hydrophobic portion is composed of a nonyl phenol and 10.5 mols of polyethylene oxide condensate as the hydrophile end.

The second wetting agent is the same as the first wetting agent except the hydrophobe is 1 mol of nonyl phenol condensed with 7 mols ethylene oxide.

The third wetting agent comprises 10 grams polyalkaline glycol ether per each hundred milliliters of ethylene tetrachloride having a solidification range 28–38° C. and a density of 1.053 taken at 40/20° C. specific gravity.

These particular alkaline emulsion cleaners can successfully be used at temperatures above the freezing point of water. After thorough scrubbing with the alkaline cleaner remover, it is preferred to rinse the glass windshield with a generous amount of distilled water until all of the emulsion cleaner is removed. It has been found desirable to rub the glass with a piece of clean cheesecloth during the early stages of this rinsing operation. Finally, it has been found desirable to again flood the windshield with distilled water, followed immediately by wiping dry with clean cheesecloth. At this stage the glass can be checked for cleanliness by checking the results of flooding with distilled water. If the surface of the glass wets uniformly, and no rivulets of water form quickly at the end of the flooding, the glass can be considered clean for the purposes of carrying on the new maintenance method of my invention. The clean glass is dried thoroughly prior to proceeding with the next maintenance step.

If the glass windshield is cleaned at temperatures below the freezing point of water, it has been found preferable to clean the glass by the following procedure. The glass is first scrubbed with the abrasive cleaner having therein a hydrocarbon-type cleaner, preferably a relatively low boiling chlorinated hydrocarbon. I have found it preferable to use as the abrasive cleaner a mixture of a major amount of perchloroethylene and a minor amount of colloidal silica and such can be applied on a soft absorbent fabric, scrubbing the glass windshield therewith. Most specifically, it has been found desirable to use a mixture of colloidal silica and perchloroethylene, about 95 percent by weight of the perchloroethylene. This mixture forms a stable abrasive cleaner gel. Colloidal silica is referred to herein as silica aerogel. The collodial silica in its preferred form has a particle size ranging from .015 to .008 micron for a surface area of 175 to 325 square meters per gram. Preferably a relatively thick film of approximately ⅛ inch minimum of the abrasive cleaner gel is applied to the surface of the glass glazing. This film is allowed to remain on the glass glazing for about eight to twelve minutes, followed by polishing off the gel with a piece of clean cheesecloth or other suitable fabric. Below the freezing point of water, I prefer to employ as the cleaner remover a detergent containing liquid which will not freeze in contact with the glass, preferably a cleaner remover of a mixture of alcohol, water, detergent and an alkaline material such as sodium silicate, sodium phosphate, trisodium phosphate, the like potassium compounds, and mixtures thereof. Generous quantities of this are used to remove all of the abrasive cleaner from the glass thoroughly. In the below the freezing point of water cleaning operation, the cleaned glass can be thoroughly dried with a piece of clean cheesecloth, and thereafter checked for cleanliness by flooding the clean surface with some of the same alkaline cleaner remover solution. If the glass is clean, the surface will wet uniformly and no rivulets will form quickly at the end of the flooding. Prior to the chemical treating step of the maintenance method, the glass is always preferably dried with a soft fabric, followed by air drying for approximately eight to twelve minutes.

The next step of the new method of maintaining glazing of my invention consists of directly applying to the clean glazing an organo silane compound, preferably organo-silicon, organo-halo silane, and/or organo-carboxy siloxane polymer compounds, and/or mixtures thereof. The reacting and treating organo-silicon compound can be applied in any suitable manner to the clean glass, but it has been found preferable to apply it in the form of a paste on a pad of fabric such as cheesecloth. A very satisfactory paste can be formed of colloidal silica and the organo-silicon compound. It is preferred to rub on a goodly portion of the paste so that there is an excess, and the paste is allowed to remain on the glass for a period of time long enough for the organo-silicon compound to react with the reactive hydrogen on the surface of the glass, preferably for a period of time of from five to fifteen minutes. At temperatures above the freezing point of water it is desired to let the paste remain on the glass for a time of from eight to twelve minutes. At temperatures below the freezing point of water the paste is allowed to remain on the glass for a time of from ten to fourteen minutes. The paste can be any suitable concentration of the organo-silicon compound. I have found that 4 to 8 parts by weight of the colloidal silica gives good results with the utilizable organo-silicon compounds. The relatively small amount of colloidal silica gives the paste proper consistency, and reacts with a very small portion of the organo-silicon compound leaving the great portion thereof available for reacting with the material treated. During this chemical treating step of the new maintenance method for glazing of my invention, the organo-silicon compound reacts with the reactive hydrogen on the surface of the hydroxylated silica or glass to form a chemically and physically united parting agent coating on the glass which is comprised of the residue of the reacting. The formed in situ parting agent coatings are very thin and are transparent layers of aliphatic siloxanes.

Preferably, only certain organo-carboxy silanes having short aliphatic hydrocarbon radicals in the molecules reactable with reactive hydrogen on the surface of the hydroxylated glass are employed in the practice of my invention. It has been found that molecules having relatively long aliphatic hydrocarbon radicals in the molecules do not perform as well on high speed vehicles. Organo-carboxy silanes can be and are preferably employed having the structural formula (A)
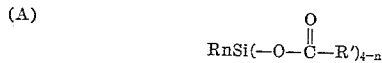

wherein $n$ is a number selected from the group consisting of 1 and 2, R is a radical selected from the group consisting of an aliphatic hydrocarbon radical having from 1 to 3 carbon atoms in the molecule, and R' is selected from the group consisting of H and an aliphatic hydrocarbon radical having from 1 to 5 carbon atoms in the molecule. Specific organo-carboxy silanes which I have found suitable and preferred are dimethyldiacetoxysilane, methyltriacetoxysilane, dimethyldiformoxysilane, methyltriformoxysilane, triacetoxy 1-2 butylbenzenesilane, dimethyldiproprionoxysilane, methyltriproprionoxysilane, diethyldiproprionoxysilane, and ethyltriproprionoxysilane. They can be used alone or in a mixture of two or more of them. A mixture of dimethyldiacetoxysilane and methyltriacetoxysilane has been found particularly satisfactory. This is evidence of my finding that where R is an aliphatic hydrocarbon radical having one carbon atom in the molecule, the hydrophobic surface has the best wear characteristic.

Organo-halo silanes can be used, and alkyl silicon halides are preferably used in the practice of my invention. I have found it desirable to use an alkyl silicon halide preferably having from 1 to 3 carbon atoms per alkyl group. By way of illustration and not undue limitation, some preferred organo-silicon compounds are methyltrichlorosilane, dimethyldichlorosilane, diethyldichlorosilane, ethyltrichlorosilane, propyltrichlorosilane, and dipropyldichlorosilane. The alkyl silicon halides can be used alone or in a mixture of two or more of them.

Other organo-silicon compounds can be used, for example, mixed organo-carboxy siloxane polymers of monomers having the structural formula (A), supra, reactive carboxyl end radicals and containing said polymers in the range preferably of dimers to tetramers, such as the polymer formed by reacting water with a mixture of dimethyldiacetoxysilane and methyltriacetoxysilane, or with a mixture of dimethyldiformoxysilane and methyltriformoxysilane.

If desired, mixtures of two or more organo-silicon compounds can be employed.

Preferably the silanes are applied in paste form. Suitable solvents for these silanes are those that do not react with silicon reagent in the silanes and are water miscible such as dimethoxymethane and p-dioxane.

The organo-silicon compound is allowed to remain on the glazing sufficient time for the reaction therebetween to be completed, and then the excess is removed from the glazing. Atmospheric vaporizable organo-silicon compounds will, of course, disappear into the atmosphere, and if a paste is used as set forth hereinbefore, the excess can be removed by rubbing off with a soft fabric, for example, a pad of cheesecloth. The treated glass windshield in then ready for use.

Treating glass by the new method of my invention to make it water repellent has been found to be of particular value. Glasses of all kinds which have been exposed to the atmosphere and water vapor of the air thereof have reactive hydrogen on the surface thereof. Reactive hydrogen on the glass surface is reacted with the organo-carboxy silanes in carrying on the new method of my invention to provide the new water repellent glass of my invention.

When the glazing is put into use, for example, on a movable object such as a vehicle, it may have deposited thereon insect contaminants such as proteins, waxes, and fat residue. Where such glazing may be on an aircraft canopy, visibility and therefore operation of an aircraft can be dangerously impaired on takeoff where such residue is massive. By using a new method of my invention these insect residue contaminants are removed from the glazing. Preferably a liquid fluid is used to remove them by hydraulic mining and solvent action. The liquid can be sprayed onto the windshield in a jet, the liquid stream furnishing the energy for the hydraulic mining. On aircraft windshields in flight, I have found it very advantageous to flood the liquid onto the windshield and let the air stream provide the energy for the liquid to mine the insect contaminants therefrom. It has been found that the liquid fluid, emitted by pressure onto the windshield, and propelled by the air stream (ram air) removes the contaminants from the windshield in a short time, approximately a time of from 4 to 30 seconds. Desirably the applicable liquid mining and solvent fluid is of high enough density to provide motion and/or act as solvent to the residue of the impacted insects or other contaminants on the windshield, also, it desirably has a surface tension low enough to penetrate under the smallest particles of the contaminating materials, and a viscosity low enough to permit rapid movement and removal. It should be kept in mind to employ a mining and solvent liquid fluid with a volatility or vapor pressure such that it will not evaporate before the job of washing the windshield has been accomplished. One practicing the method of my invention should remember to provide for removing residual film resulting from use of certain wash solutions or materials, for example, those occurring when hydrocarbons such as kerosene are used. Any suitable liquid mining and solvent fluid can be employed. In the following is set forth some particularly desirable ones, which have been found to work well. They are set forth for illustration purposes only, and are not to unduly limit the scope of my invention. These preferred ones are water; water and a detergent such as sodium dodecyl benzene sulphonate or sodium alkyl aryl sulphonate; aliphatic hydrocarbon fractions, for example relatively low boiling hydrocarbon fractions such as kerosene, JP-4 which is the common turbojet engine fuel having a boiling range substantially similar to kerosene, and the like; aromatic hydrocarbon materials and fractions, for example toluene, xylene, etc.; and the like. Residual film from hydrocarbon mining fluids can be removed in flight by flooding the windshield with alkaline solutions followed by a water wash. A water wash has been found suitable to remove any and all detergent containing mining liquids from the windshield while in flight. In carrying on the liquid mining and solvent step of the windshield maintenance method of the invention, it has been found highly desirable to emit the mining and wash fluids onto the windshield in flight usually along the lower edge of those windshields that slope upwardly and rearwardly. The air stream then propels the fluids across the windshields with relatively great velocity and having relatively great energy for mining the insect contaminants from the windshield. This same method and principle has been found desirable to employ on other transparent areas of aircraft.

In the windshield maintenance steps of the invention wherein a glass surface is treated, a canopy type cover or other means of protection should be used above the windshield to keep any water droplets off the glass surface, in the event the parting agent paste, etc., is being applied outdoors during rain, drizzle, or fog.

The maintenance personnel should protect their hands with rubber gloves. Adequate ventilation during application of the parting agents should be provided, and the personnel should refrain from inhaling the fumes and wear safety glasses both during the handling and applying the parting agent. Note that in the event of spillage on the skin, a generous amount of water should be used to flood the area affected followed by medical attention.

The usual windshield wiper should be lifted from the glass glazing surface and protected from the parting agent at the time of its application. After the parting agent is applied and polished from the windshield, the wiper can again be allowed to rest on the surface.

Care should be taken to not wipe or spill any of the parting agent on the windshield sealer, metal frame therearound, or on the airplane skin. In case of spillage on these areas, wash the affected area with a generous amount of an alkaline cleaner, preferably flooding the area and scrubbing to neutralize and wash away the parting agent.

The parting agents used in the aircraft glazing maintenance method of my invention will normally last through approximately thirty minutes of rain, followed by eight alternate bug contamination and wash cycles, followed by approximately thirty minutes of rain. After completing such usage of the maintained glazing, the surface should again be cleaned and treated with parting agents. It has been found that if the windshield is subjected to severe blowing dust and grit, the surface should be cleaned and again treated with parting agent.

An easy to accomplish test has been developed with which a glass windshield surface can be checked for water repellency in carrying on the new method of my invention. Place a few drops of water on the glass surface to be checked with an eyedropper. If the surface is sufficiently water repellent after parting agent treatment to permit rapid and good bug contaminant removal, the droplets will form spherical high sided droplets. If the surface of the glass glazing is unsatisfactory the drops of water will flatten out into a film. If an eyedropper is not handy, water flecked from a person's fingers can be used to make the repellency check. Of course, the check solution must be free of surfactants, soaps, detergents, wetting agents, and the like. At temperatures below the freezing point of water, the glass glazing should be checked for water repellency after the surface has been heated to above the freezing point of water, for example, when such occurs as a result of a window electric heating system.

I have also discovered that plastic materials having reactive hydrogen on the surfaces thereof are made surface inert by the new method of my invention. Hydrophilic plastics are made hydrophobic by my invention. Especially advantageous is the treatment of plastic sheets or films with organo silanes to provide physical and chemical inertness in the presence of difficult chemical environments such as those found in processing of laminated plastic parts. More specifically, my invention is of great advantage when used for treating bag film or sheet in the production of plastic objects by the vacuum bag or vacuum bag-autoclave method, and in high pressure heated presses wherein the problems involved with the parting film-vacuum bag increase greatly as the temperature and/or pressure rise. The parting problem with these films reaches its magnitude in high temperature formed materials where it is sometimes required to remove the film or sheet from the formed laminate or other part by abrading with sand paper or by scraping, which is costly and laborious and damaging in many cases to the plastic laminate product. And, in these instances with the new method of my invention it has been possible to eliminate the usual waxes, oils, metallic, complexes and other materials normally used on the plastic film or sheet, which do not do the job because of migration of the waxes, oils, etc. into the plastic laminate with no change in adhesion of the film or sheet to the plastic laminate product. Particularly good results have been obtained with polyvinylalcohol film, polyallyalcohol film, polyamide (nylon) film, and cellulose film.

The plastic sheets or films, molds, etc., can be treated with the organo silane compounds such as organo-silicon, organo-halo silanes, and organo-siloxane polymers, and mixtures thereof in any suitable manner, in suitable solvents and preferably by contacting the plastic material to be treated with the organo silane in paste form, such as described hereinbefore relative to treatment of glass. Also, the times set forth hereinbefore and the concentrations can be duplicated in the case of treating plastic materials, keeping in mind that contact should be on the high side in regard to time when the temperature of treating is at or below the freezing point of water. Normally, the plastic film or sheet will be treated at or near room temperature, thus requiring a minimum of contact time between the plastic and the organo silane. Of course, the plastic sheet or mold should be clean and dry when contacted with the organo-carboxy silane. Any suitable cleaning method can be used to prepare the plastic surface for treating, keeping in mind that solvents, etc., should not be used which will mar or dissolve the plastic material.

A particularly desirable and proven method of utilizing my invention is to sray or brush a priming solution on a mold to be used in forming plastic parts, laminates or otherwise, such primer sticking or adhering to the surface of the mold. For example, a satisfactory priming solution may comprise polyvinylalcohol in water, starch in water, shellac in alcohol, tragacanth in alcohol, or the like. When these dry on the mold it is covered with a coating of polyvinylalcohol, shellac, etc., having reactive hydrogen on the surface thereof. This coating in turn is then reacted with the organo silane to provide for the parting agent coating.

As the result of reacting the organo silane with the reactive hydrogen, including hydroxyls, on the surface there is formed a coating which is the residue of the reacting. This residue coating is believed to be monomolecular in most instances.

Many uses have been found for the plastic material treating method of my invention, and the new parting agent coated plastic materials of my invention resulting from the new method. The coated plastic materials can be used for packaging of materials that might be contaminated by reaction with the sheet or film covering, for instance, medical supplies, chemicals, foodstuffs, and the like. They can be used for packaging preimpregnated plastics and adhesive tapes. They are valuably used in the fabrication handling of adhesives as well as plastic material products, and of particular value, they can be used to solve the parting film problems relative the epoxy adhesives and plastic materials.

In the following is set forth examples of the new method and means of my invention wherein glass and plastic materials having reactive hydrogen on the surface thereof are treated with organo silanes to make them water repellent and/or easily partable from other materials.

It is to be understood that the materials, temperatures, times, procedures, etc., set forth are for teaching those skilled in the art and for illustrative purposes only, and are not to unduly limit the scope of the invention.

The following Examples I through XI show how organo-silicon compounds can be used with excellent results on windshields of high speed vehicles not only for use as a water repellent, but also for use in my novel method for removing insect residue contaminants therefrom as particularly shown in Example I.

*Example I*

A test was run on a sheet of glass aircraft glazing which was heavily soiled to a degree encountered as a result of actual use and flight. This dirty glass glazing was cleaned at room temperature.

The sheet of glass aircraft glazing was scrubbed with a generous amount of aluminum polish carried on clean cheesecloth. The resulting scrubbed glass glazing was rinsed with a generous amount of distilled water until all of the aluminum polish was removed.

Then, the glass glazing was scrubbed with a generous amount of an alkaline emulsion cleaner on clean cheesecloth for approximately two to three minutes. The resulting glass glazing was rinsed with a generous amount of distilled water, and the alkaline emulsion cleaner was removed. During this rinsing operation, in the first portion thereof, the glass glazing was scrubbed with a piece of clean cheesecloth.

Finally, the surface was flooded with distilled water, and dried immediately by wiping with clean cheesecloth. The clean and dry surface of the glass glazing was checked for cleanliness by flooding with distilled water and the surface wet uniformly. No rivulets of water formed quickly at the end of this distilled water flooding.

The clean surface was again thoroughly dried with clean cheesecloth, and allowed to air dry for approximately ten minutes.

To the resulting clean glass glazing a parting agent paste was applied using a clean cheesecloth pad to rub the parting agent paste onto and completely coat the surface. A slight excess of the parting agent paste was allowed to remain on the surface for approximately ten minutes. The parting agent paste was then polished from the surface of the glass glazing using clean cheesecloth. The parting paste utilized was a mixture of 6.5 parts by weight of silica aerogel, and 100 parts by weight of a mol to mol equivalent on the basis of reactive acetoxy groups of dimethyldiacetoxysilane and methyltriacetoxysilane.

The thus treated glass glazing was tested in a wind tunnel at air speeds of from 170 knots to 450 knots per hour by introducing separately bees, grasshoppers and crickets into the air stream and impacting them against the glazing. In each instance insect proteins, waxes and fats contaminated the glazing after such impacting. Visibility through the glass was very poor.

The bug contaminated glazing was then washed in the wind tunnel first with JP-4 fuel followed by washing with a solution of water 100 parts by weight, sodium dodecyl benzene sulphonate 0.25 part by weight, anhydrous sodium silicate 0.05 part by weight and anhydrous sodium phosphate 0.20 part by weight. Dehydrated material can be used, if desired, by adjusting for water of hydration. In the tests, the washing solutions were flowed across the bug contaminated glazing, being carried thereacross by the air stream. The JP-4 fuel wash was continued until essentially all the bug film had been removed, which occurred rapidly. The final wash solution was flooded over the surface in a film of the solution, this being continued until no residual film was observed on the dried surface after flooding, which occurred very rapidly. JP-4 fuel is a kerosene commonly used to fuel turbojet engines.

The bug contaminant removal was excellent and very rapidly accomplished.

*Example II*

A small sheet of relatively clean glass was scrubbed with an alkaline cleaner containing trisodium phosphate in water. The sheet of glass was then rinsed with a generous amount of distilled water, and the alkaline cleaner removed. During the rinsing operation, in the first portion thereof, the glass was scrubbed with a piece of clean cheesecloth.

The glass surface was wiped dry with clean cheesecloth, and checked for cleanliness by flooding with distilled water. The surface of the glass wet uniformly, and no rivulets of water formed quickly at the end of the flooding with the distilled water.

The clean surface was thoroughly dried again with cheesecloth, and allowed to air dry for approximately ten minutes.

To the resulting clean glass, a paste was applied using a clean cheesecloth pad to rub the paste onto and completely coat the clean surface. The paste was allowed to remain on the surface for approximately ten minutes. Then the paste was polished from the surface of the glass using clean cheesecloth. The paste used was a 3:1 molar mixture of dimethyldiacetoxysilane and methyltriacetoxysilane based on reactive acetoxy groups dissolved in dimethoxymethane solvent to which had been added colloidal silica referred to herein as silica aerogel. One hundred parts by weight of the solution of the silanes were mixed with 6 parts by weight of the silica aerogel. The silanes reacted with the glass.

After the excess paste was removed from the glass surface by polishing it therefrom with cheesecloth, distilled water was dropped thereon from an eyedropper. The surface of the glass greatly repelled the distilled water.

Some of the same distilled water was dropped onto an area of the same glass which had not been reacted with the silanes, and the water thoroughly wet this untreated area.

After many contacts with water followed by drying, the treated glass still repelled water greatly.

The experiment was carried out at room temperature.

*Example III*

The same tests as set forth in Example II were carried out under the same conditions, except that the solution of the silanes in the dimethoxymethane solvent was not jelled into a paste, but applied directly to the clean surface of a sheet of glass, and allowed to remain in contact therewith approximately five minutes at room temperature.

Again a reaction occurred between the glass and the silanes.

The treated glass surface wiped free of the solvent and dried, readily repelled distilled water dropped thereon, as compared to an untreated clean area of the same glass which was thoroughly wet by some of the same distilled water.

*Example IV*

The same tests under the same conditions as set forth in Examples II and III were run using as the silane, a 1:1 mol equivalent on the basis of reactive acetoxy groups of a mixture of dimethyldiacetoxysilane and methyltriacetoxysilane in dimethoxymethane solvent.

The water repellency of the treated glass was very great, and the repellency was retained particularly well through a large number of water wettings and dryings thereafter.

*Example V*

Dimethyldiformoxysilane in dimethoxymethane solvent was flooded onto a clean glass sheet, and allowed to remain in contact therewith for approximately five minutes. The solution was then wiped from the glass sheet, and the surface dried with a soft absorbent cloth.

Distilled water was dropped onto the glass from an eyedropper. The surface of the glass greatly repelled the water.

Some of the same distilled water was dropped onto an area of the glass which had not been contacted with the dimethyldiformoxysilane. The water thoroughly wet this area.

*Example VI*

Dimethyldiformoxysilane and methyltriacetoxysilane were mixed in a ratio of 2:1, respectively, on a reactive equivalent basis, the mixing was accomplished in dimethoxymethane solvent.

The resulting solution was flooded onto a clean glass surface, and allowed to remain in contact therewith for approximately five minutes.

The resulting treated area was wiped of the solution and dried with a piece of cheesecloth.

This area was contacted with distilled water from an eyedropper, and the area repelled the water excellently.

A check of another area of the clean glass with distilled water showed it to be easily wet therewith.

*Example VII*

Methyltriformoxysilane and dimethyldiformoxysilane were mixed together in dimehoxymethane solvent and in a ratio of 1:1 reactive equivalents.

The resulting solution was flooded onto a glass surface which had been thoroughly cleaned, and the solution remained in contact therewith for approximately five minutes.

The solution was then wiped from the glass surface, and the surface dried.

Distilled water was dropped thereon, and the surface greatly repelled same.

An untreated area of the same glass surface was easily wet with the same distilled water.

*Example VIII*

The same experiment as set forth in Example VII was run using a 2:1, respectively, reactive equivalents ratio of methyltriformoxysilane to dimethyldiformoxysilane in dimethoxymethane solvent.

This parting agent gave very good results, the glass surface repelling the water very well.

*Example IX*

A parting agent of dimethyldiacetoxysilane in dimethoxymethane solvent was contacted with a clean glass surface. The solution was allowed to remain in contact therewith for approximately five minutes. The solution was then wiped from the surface, and the surface dried.

Water dropped onto the surface from an eyedropper was repelled by the treated surface.

Some of the same water was dropped onto an untreated area of the glass, and this untreated area was easily wet by the water.

*Example X*

The same experiment as set forth in Example IX was run using methyltriacetoxysilane.

Excellent water repellency was obtained.

*Example XI*

Two like glass sheets after being cleaned with alkaline cleaner were treated at room temperature, one with dimethyldiacetoxysilane in dimethoxymethane solvent, and the other with methyltriacetoxysilane in dimethoxymethane solvent. The concentrations were the same, and the conditions of the treatment were exactly alike.

Each of the finally treated glass surfaces were highly water repellent after reaction with the silanes. Each of the treated glass surfaces were repeatedly wet with distilled water followed by drying. The glass treated with the methyltriacetoxysilane retained its repellency longer, indicating it to be the tougher coating.

Organo-halo silanes have been found to be especially useful for making normally hydrophilic materials hydrophobic, and thus providing new and useful water repellent and partable materials. Examples XII and XIII are specifically directed to the removal of insect residue from windshields. Examples XIV through XVI are directed to making the surface of glass water repellent. Examples XVII through XXXV are directed to making plastic surfaces partable, inert, and hydrophobic.

*Example XII*

A test was run on a heavily soiled sheet of glass aircraft glazing, soiled to a degree encountered as a result of use in flight. The glass glazing was cleaned below the freezing point of water at about zero degrees F.

A mixture of silica aerogel and perchloroethylene was prepared having 94.5 percent by weight of the perchloroethylene. The mixture formed a stable gel. A thick film of the resulting gel of a minimum thickness of ⅛ inch was applied to the surface of the glass glazing, and allowed to remain thereon ten minutes. Then this was polished off with a piece of clean cheesecloth.

An alkaline cleaner was prepared from a mixture of water 100 parts by weight, sodium dodecyl benzene sulphonate 0.25 part by weight, anhydrous sodium silicate 0.05 part by weight and anhydrous sodium phosphate 0.20 part by weight; and an equal weight amount of methanol. A generous quantity of the resulting alkaline cleaner solution was applied to the glass glazing using a clean pad of cheesecloth, and the glass surface was scrubbed therewith. The resulting surface was immediately dried with clean cheesecloth.

The resulting dried glass glazing was checked for cleanliness by flooding with some of the alkaline cleaner solution. Rivulets did not form quickly at the end of the flooding, indicating a clean glazing surface. The glass glazing surface wet uniformly during the flooding. The glass surface was dried thoroughly with clean cheesecloth, and then allowed to air dry for ten minutes.

A parting agent paste was applied to the resulting cleaned glass glazing using a clean cheesecloth pad to rub the parting agent paste onto and completely coat the surface. The paste was allowed to remain on the surface for approximately ten minutes. A piece of clean cheesecloth was used to polish the parting agent paste from the surface of the glass glazing. In this test the parting agent paste was a mixture of silica acrogel 6 parts by weight and 100 parts by weight of a mixture of methyltrichlorosilane and dimethyldichlorosilane.

The treated glass glazing was tested in a wind tunnel at air speeds of from 170 knots to 450 knots per hour by separately introducing grasshoppers, crickets and bees into the air stream and impacting them against the glazing. Proteins, waxes and fats contaminated the glazing after such impacting in each instance. Visibility through the glass was very poor.

The bug contaminated glazing was then washed in the wind tunnel in the air stream, first with JP–4 fuel followed by washing with some of the alkaline cleaner described hereinbefore in this example. The washing solutions were flowed across the bug contaminated glazing, the air stream carrying them thereacross. The JP–4 fuel wash rapidly cleared the bug contaminants from the glazing. The alkaline wash solution was continued until no residual film was observed after flooding. This also occurred very rapidly.

*Example XIII*

The same tests were performed as set forth in Example I and under the same conditions, but utilizing as the parting agent paste a mixture of methyltrichlorosilane and dimethyldichlorosilane, and chemically a mol to mol equivalent of reactive chlorine of dimethyldichlorosilane and methyltrichlorosilane, and mixed therewith silica aerogel. One hundred parts by weight of the mixture of methyltrichlorosilane and dimethyldichlorosilane were mixed with 6 parts by weight of silica aerogel.

Here again, the bug contaminant removal was excellent and very rapidly accomplished.

Example XIV

A solution of dimethyldichlorosilane in p-dioxane solvent was flooded onto a clean glass surface, and allowed to remain in contact therewith for approximately five minutes. The solution was then wiped from the glass, and the glass surface dried.

Distilled water dropped onto the treated area with an eyedropper was greatly repelled.

An untreated area of the same glass was easily wet with some of the same distilled water.

Example XV

A clean glass sheet was treated with diethyldichlorosilane in p-dioxane solvent. The solution was flooded onto the glass, and allowed to remain in contact therewith for about five minutes.

The solution was wiped from the glass and the surface of the glass was dried.

Distilled water was dropped onto the treated area, and it was repelled well.

A check with some of the same distilled water on an untreated area of the glass resulted in thorough wetting.

Example XVI

The same tests as in Example XV were run on another piece of clean glass using a mixture of 1:1 reactive equivalents of diethyldichlorosilane and methyltrichlorosilane in dimethoxymethane solvent. The results were very good, the distilled water being greatly repelled from the treated area of the glass.

Example XVII

Dimethyldichlorosilane and methyltrichlorosilane were mixed together in a ratio of 1:1 retactive equivalents of chlorine. Six parts by weight of silica aerogel were mixed with 100 parts by weight of the silane mixture, to form a paste.

The paste was smeared on clean and atmosphere exposed polyvinylalcohol film at room temperature, allowed to dry and react, and the excess was removed by wiping with clean cheesecloth. The resulting treated film was then used as the bag for vacuum bag forming of parts from triallyl cyanurate modified polyester by the usual production methods.

The formed parts separated very easily from the polyvinylalcohol film, with no sticking whatsoever encountered.

Example XVIII

The same test under the same conditions as set forth in Example XVII was performed, using cellophane as the film. Again, no sticking occurred.

Example XIX

A paste was made, composed of 6 parts by weight of silica aerogel and 100 parts by weight of a mixture of dimethyldichlorosilane and methyltrichlorosilane in a ratio of 1:1 reactive equivalents of chlorine.

The paste was smeared on the surface of a clean and atmosphere exposed polyvinylalcohol film, at room temperature, allowed to dry and react and the excess was removed by wiping with clean cheesecloth. The resulting treated film was then used as the bag for a vacuum bag forming of parts from bisphenol A diglycidyl ether polymer cured with a mixture of aromatic amines by the usual production methods. The formed part readily separated from the film, with no sticking.

Example XX

The same test under the same conditions as set forth in Example XIX was performed, using cellophane as the film. Again, no sticking was encountered.

Example XXI

A paste was made up comprised of 6 parts of silica aerogel and 100 parts of a mixture of methyltrichlorosilane and dimethyldichlorosilane in a 1:1 mixture of reactive chlorine.

The paste was spread evenly on a clean and atmosphere exposed polyvinylalcohol film, at room temperature, allowed to dry and react and the excess was removed by wiping with clean cheesecloth. The resulting treated film was then used as the bag to form a part from bisphenol A diglycidyl ether polymer cured with trimellitic anhydride by the usual methods.

The paste separated easily from the forming film. No sticking occurred.

Example XXII

A paste was made up comprised of 6 parts of silica aerogel and 100 parts of a mixture of methyltrichlorosilane and dimethyldichlorosilane in a 1:1 mixture of reactive chlorine.

The paste was spread evenly on a clean and atmosphere exposed polyvinylalcohol film, at room temperature, allowed to dry and react and the excess was removed by wiping with clean cheesecloth. The resulting treated film was then used as the bag to form a part from bisphenol A diglycidyl ether polymer cured with pyromellitic dianhydride by the usual methods.

The paste separated easily from the forming film. No sticking occurred.

Example XXIII

A paste was made up comprised of 6 parts of silica aerogel and 100 parts of a mixture of methyltrichlorosilane and dimethyldichlorosilane in a 1:1 mixture of reactive chlorine.

The paste was spread evenly on a clean and atmosphere exposed polyvinylalcohol film, at room temperature, allowed to dry and react and the excess was removed by wiping with clean cheesecloth. The resulting treated film was then used as the bag to form a part from bisphenol A diglycidyl ether polymer cured with hexachlorobicycloheptenedicarboxy anhydride by the usual methods.

The paste separated easily from the forming film. No sticking occurred.

Example XXIV

Tests similar to Example XXI, Example XXII, and Example XXIII were performed, using cellophane as the film instead of polyvinylalcohol. Again, no sticking occurred.

Example XXV

A paste was made up comprised of 6 parts of silica aerogel and 100 parts of a mixture of methyltrichlorosilane and dimethyldichlorosilane in a 1:1 mixture of reactive chlorine.

This paste was smeared on the surface of a clean and atmosphere exposed polyvinylalcohol film at room temperature, allowed to dry and react and the excess was removed by wiping with clean cheesecloth. The resulting treated film was then used as the bag to form a part from bisphenol A diglycidyl ether polymer cured with mixed methylbicycloheptenedicarboxy anhydride by the usual production methods.

The paste separated very nicely from the film.

Example XXVI

A test similar to Example XXV was run, using cellophane as the film. Again, the film parted easily from the formed plastic part.

Example XXVII

Dimethyldichlorosilane was dissolved in p-dioxane at room temperature. A sheet of clean polyvinylalcohol which had been exposed to the atmosphere was treated with this solution at room temperature, and the silane reacted therewith. The sheet was then rubbed dry of the solution with a piece of clean cheesecloth. The resulting surface of the film was inert.

*Example XXVIII*

A test similar to Example XXVII was performed, using cellophane as the sheet. Again, the resulting film was surface inert.

*Example XXIX*

Example XXVII was repeated, using methyltrichlorosilane in place of dimethyldichlorosilane. Results were excellent.

*Example XXX*

Example XXVIII was repeated, using methyltrichlorosilane in place of dimethyldichlorosilane. Results again were very good.

*Example XXXI*

Diethyldichlorosilane was used in place of dimethyldichlorosilane, under conditions similar to those of Example XXVII. Results were very satisfactory.

*Example XXXII*

Example XXXI was repeated, alternating cellophane film. The treated surface was inert.

*Example XXXIII*

A 1:1 reactive equivalent mixture was made up of diethyldichlorosilane and methyltrichlorosilane dissolved in p-dioxane.

This was used to treat a clean and atmosphere exposed film of polyvinylalcohol at room temperature, allowed to dry and react, and the excess was removed by wiping with clean cheesecloth. The resulting film was then used as the bag to form plastic parts by the usual production methods. No difficulty was encountered in separating the formed parts from the film.

*Example XXXIV*

Example XXXIII was repeated, using cellophane film in place of polyvinylalcohol film. Results were good.

*Example XXXV*

A plastic material forming mold made of aluminum powder filled and amine cured epoxy resin was painted at room temperature with a polyvinylacetate solution in water to give an in situ film of the polyvinylacetate on the mold surface. The polyvinylacetate film was allowed to dry.

After drying, the mold surface of polyvinylacetate was treated at room temperature with a mol to mol ratio based on equivalents of reactive chlorine of methyltrichlorosilane and dimethyldichlorosilane in p-dioxane solvent. The solution was allowed to remain in contact with the polyvinylacetate for approximately ten minutes, and the organohalogensilanes reacted therewith.

The resulting mold was washed free of the treating solution with denatured alcohol and dried.

Then the mold was used to form a fiber glass reinforced radome of a copolymer of a polyester and triallyl cyanurate. The usual vacuum forming methods were employed.

Upon completion of the radome forming and curing, it was easily removed from the mold. No sticking to the mold was encountered.

The radome could not be successfully made with the mold untreated due to the sticking of the radome to the mold surface, making it impossible to remove it in complete and good condition.

Examples XXXVI through XXXXIV show the usefulness of organo-carboxy siloxane polymers in my invention. Example XXXVI is drawn to my method of rendering glass water repellent and removing bugs. Examples XXXVII through XXXX are directed to the treating of glass. Examples XXXXI through XXXXIV are directed to the treating of plastics.

*Example XXXVI*

The same below the freezing point test was run as in Example XIII and under the same conditions. The paste used was a mixture of silica aerogel 6.5 parts by weight, and 100 parts by weight of a mol to mol equivalent on the basis of reactive acetoxy groups of dimethyldiacetoxysilane and methyltriacetoxysilane.

In these tests the bug contaminants were removed completely and very rapidly.

*Example XXXVII*

Dimethyldiacetoxysilane was mixed with methyltriacetoxysilane in a ratio of 3 mols to 1 mol, respectively, in dimethoxymethane solvent.

Distilled water was added to the resulting mixture. An exothermic reaction occurred and a polymer was formed.

Some of the resulting polymer in solution was placed upon a clean sheet of glass, and allowed to remain thereon approximately five minutes. Then the glass was wiped dry with a soft absorbent cloth.

The resulting treated area was contacted with distilled water by dropping the water thereon from an eyedropper.

The water was repelled by the treated surface excellently.

Some of the same distilled water was dropped from the eyedropper on a portion of the clean glass which had not been treated. This portion of the glass was thoroughly wet by the water.

*Example XXXVIII*

The same tests as set forth in Examples II and III were run under the same conditions using as the treating agent dimethyldiformoxysilane dissolved in dimethoxymethane solvent.

The dimethyldiformoxysilane reacted with the clean glass readily, and resulted in a good water repellent coating thereon.

*Example XXXIX*

The same tests under the same conditions as set forth in Examples II and III were run using the silane, a mixture in dimethoxymethane solvent of a 2:1 ratio based on reactive equivalents of dimethyldiformoxysilane and methyltriacetoxysilane.

Here again reaction with the clean glass surface was accomplished, and the coating resulting therefrom readily repelled water.

*Example XXXX*

The same tests under the same conditions as in Examples II and III were run using as the silane a 1:1 ratio based on reactive equivalents of methoxy groups of a mixture of methyltriformoxysilane and dimethyldiformoxysilane in dimethoxymethane solvent.

Good results occurred in each instance, the glass greatly repelling water after reactive treatment with the silane.

The same tests were run with a silane mixture in a ratio of 2:1 based on reactive equivalents of the methyltriformoxysilane and dimethyldiformoxysilane. These mixtures gave the same good results.

The mixture of silanes was varied to a ratio of 3:1 based on reactive equivalents of the methyltriformoxysilane and dimethyldiformoxysilane. Again good water repellent results were obtained as the result of the reactive coating of the clean glass surface.

*Example XXXXI*

A plastic material forming mold made of aluminum powder filled and amine cured epoxy resin was painted at room temperature with a polyvinylacetate solution in water to give an in situ film of the polyvinylacetate on the mold surface. The polyvinylacetate film was allowed to dry.

After drying, the mold surface of polyvinylacetate was treated at room temperature with a mol to mol ratio based on reactive equivalent of a mixture of dimethyldiacetoxysilane and methyltriacetoxysilane in dimethoxymethane solvent. The solution was allowed to remain in contact with the polyvinylacetate for approximately ten minutes, and the acetoxysilanes reacted therewith.

The resulting mold surface was washed free of the treating solution with denatured alcohol and dried.

Then the mold was used to form a fiber glass reinforced radome of a copolymer of a polyester and triallyl cyanurate. The usual vacuum forming methods were employed.

Upon completion of the radome forming and curing, it was easily removed from the mold. No sticking to the mold was encountered.

The radome could not be successfully made with the mold untreated due to the sticking of the radome to the mold surface, making it impossible to remove it in complete and good condition.

*Example XXXXII*

A mixture of dimethyldiacetoxysilane and methyltriacetoxysilane in a ratio of 3:1 based on reactive acetoxy groups and in dimethoxymethane solvent was reacted with water added thereto at room temperature. Upon adding the water, an exothermic reaction occurred, and a polymer formed.

The resulting mixture having the polymer therein was contacted at room temperature with clean glass and polyvinylacetate film. The polymer remained in contact with the glass and polyvinylacetate for approximately ten minutes.

In each instance the glass and film were dried with clean cheesecloth followed by air drying.

The resulting surfaces were contacted with distilled water from an eyedropper. They both repelled water readily.

Control tests of glass and polyvinylacetate film which were clean were run. Both were thoroughly wet with some of the same distilled water. The tests were carried out at room temperature.

*Example XXXXIII*

A sheet of polyvinylacetate was treated at room temperature with a paste having therein in a ratio of 1:1 based on equivalents of reactive acetoxy groups, a mixture of dimethyldiacetoxysilane and methyltriacetoxysilane in dimethoxymethane solvent to which had been added silica aerogel in an amount of approximately 6 parts by weight of the gel per 100 parts by weight of the silane containing solution. The paste was spread evenly over the sheet of polyvinylacetate, and allowed to remain in contact therewith for approximately ten minutes. The excess paste was removed from the sheet of polyvinylacetate by rubbing it therefrom with a piece of clean cheesecloth.

The resulting treated sheet was wet with distilled water from an eyedropper, and the sheet readily repelled the water.

A control test with a like sheet of polyvinylacetate and some of the same distilled water resulted in good wetting of the surface of the polyvinylacetate film.

The same tests were run with polyvinylalcohol film, cellophane, a sheet of copolymer of a polyester and triallyl cyanurate, a sheet of a bisphenol A diglycidyl ether polymer cured with a mixture of aromatic amines, a sheet of bisphenol A diglycidyl ether polymer cured with trimellitic anhydride, a sheet of bisphenol A diglycidyl ether polymer cured with pyromellitic dianhydride, and a sheet of bisphenol A diglycidyl ether polymer cured with mixed methylbicycloheptenedicarboxy anhydrides.

In each instance the treated film or sheet readily repelled distilled water, as compared to the untreated sheet or film which was thoroughly wet with some of the same distilled water.

*Example XXXXIV*

A polyvinylalcohol film was treated at room temperature with a mixture of dimethyldiformoxysilane and methyltriacetoxysilane in dimethoxymethane solvent. The solution having therein in a ratio of 2:1 based on reactive equivalents of the acetoxysilane to the formoxysilane.

The resulting film was used in a common vacuum bag forming process to make parts of fiber glass reinforced triallyl cyanurate modified polyester. This polyester is a copolymer of triallyl cyanurate and a polyester, and containing phosphorous trichloride, that has been cured with a dianhydride.

The formed parts parted very easily from the treated polyvinylalcohol film, with no sticking whatsoever encountered.

Controlled tests run under the same conditions and with like film except for no silane treatment resulted in great difficulty in sticking of the bag film to the triallyl cyanurate modified polyester parts.

As will be evident to those skilled in the art, various modifications of this invention can be made, or followed, in the light of this disclosure and discussion, without departing from the spirit or scope of the disclosure or from the scope of the claims.

What is claimed is:

1. A method of maintaining glass glazing vulnerable to impact by insects comprising the steps of, scrubbing said glass glazing with an abrasive cleaner on a soft absorbent fabric, scrubbing the resulting glazing with a detergent containing alkaline cleaner remover on a soft absorbent fabric, rinsing the resulting glazing with a cleaner remover, drying the resulting glazing, directly applying by rubbing to the resulting clean glazing having reactive hydrogen thereon a paste comprising a mixture of dimethyldichlorosilane and methyltrichlorosilane and colloidal silica and carried on a soft fabric, allowing said paste to remain in contact with said glazing from five to fifteen minutes and reacting said dimethyldichlorosilane and methyltrichlorosilane with said reactive hydrogen on said glass to form a chemically and physically united coating on said glass comprising the residue of said reacting, rubbing off the excess of said paste with a soft fabric, and removing insect residue impacted on said glazing by flooding same with kerosene followed by flooding with a detergent containing methanol solution of an alkaline cleaner.

2. A method of maintaining aircraft glass glazing vulnerable to impact by insects comprising the steps of, scrubbing said glass glazing at a temperature above the freezing point of water with an aluminum polish cleaner comprising finely divided aluminum oxides dispersed in water containing a detergent on a soft absorbent fabric, scrubbing the resulting glazing with an alkaline cleaner remover on a soft absorbent fabric, said alkaline cleaner remover comprising an aqueous emulsified mixture of perchloroethylene and sodium silicate and sodium phosphate and containing detergent, rinsing the resulting glazing with water, drying the resulting glazing, directly applying by rubbing to the resulting clean glazing having reactive hydrogen thereon a paste comprising a mixture of dimethyldichlorosilane and methyltrichlorosilane and colloidal silica and carried on a soft fabric allowing said paste to remain in contact with said glazing from eight to twelve minutes and reacting said dimethyldichlorosilane and methyltrichlorosilane with said reactive hydrogen on said glass to form a chemically and physically united coating on said glass comprising the residue of said reacting, rubbing off the excess of said paste with a soft fabric, and removing insect residue impacted on said glazing by flooding same with kerosene during flight followed by flooding during flight with a detergent containing methanol solution of an alkaline cleaner.

3. A method of maintaining aircraft glass glazing vulnerable to impact by insects comprising the steps of, scrubbing said glass glazing at a temperature below the freezing point of water with a mixture of a major amount of a perchloroethylene and a minor amount of colloidal silica on a soft absorbent fabric, scrubbing the resulting glazing with a methanol solution of a detergent containing alkaline cleaner remover of sodium silicate and sodium phosphate on a soft absorbent fabric, drying the resulting glazing, directly applying by rubbing to the resulting clean glazing having reactive hydrogen thereon a paste comprising a mixture of dimethyldichlorosilane and methyltrichlorosilane and colloidal silica and carried on a soft fabric, allowing said paste to remain in contact with said glazing from ten to fourteen minutes and reacting said dimethyldichlorosilane and methyltrichlorosilane with said reactive hydrogen on said glass to form a chemically and physically united coating on said glass comprising the residue of said reacting, rubbing off the excess of said paste with a soft fabric, and removing insect residue impacted on said glazing by flooding same with kerosene during flight followed by flooding during flight with a detergent containing methanol solution of said alkaline cleaner.

References Cited by the Examiner

UNITED STATES PATENTS

| | | |
|---|---|---|
| 2,306,222 | 12/1942 | Patnode. |
| 2,405,988 | 8/1946 | Barry _____ 260—448.8 |
| 2,439,689 | 4/1948 | Hyde. |
| 2,445,572 | 7/1948 | Gerould et al. |
| 2,562,955 | 8/1951 | Schuyten et al. _____ 260—212 |
| 2,666,685 | 1/1954 | Hommel et al. ____ 106—38.22 |

FOREIGN PATENTS 481,025  2/1952  Canada.

ALFRED L. LEAVITT, *Primary Examiner.*

JOSEPH B. SPENCER, MURRAY KATZ,
*Examiners.*

J. P. McINTOSH, H. COHEN, *Assistant Examiners.*